United States Patent [19]

Blodgett

[11] Patent Number: 4,866,572
[45] Date of Patent: Sep. 12, 1989

[54] PORTABLE COMBINATION OF FOOD PREPARATION UNIT

[76] Inventor: Jeffrey J. Blodgett, 9608 W. Echo La., Peoria, Ariz. 85345

[21] Appl. No.: 129,588

[22] Filed: Dec. 7, 1987

[51] Int. Cl.$^4$ .............................................. H05K 7/00
[52] U.S. Cl. ..................... 361/393; 62/331; 62/457.9; 206/501; 206/549; 219/387; 361/396; 361/429
[58] Field of Search .................. 62/331, 457; 206/501, 206/541, 546, 549; 219/10.55 R, 202, 385–387, 521; 220/23.83, 23.86, DIG. 10; 307/150; 312/253; 361/331, 334, 380, 393, 396, 429

[56] References Cited

U.S. PATENT DOCUMENTS

| | | | |
|---|---|---|---|
| 985,020 | 2/1911 | Edwards | 206/546 |
| 2,645,332 | 7/1953 | Martin et al. | 206/546 |
| 4,420,678 | 12/1983 | Kalb | 219/387 |
| 4,543,471 | 9/1985 | Anderson | 219/387 |
| 4,680,674 | 7/1987 | Moore | 361/396 |

Primary Examiner—A. D. Pellinen
Assistant Examiner—Gregory D. Thompson
Attorney, Agent, or Firm—Charles P. Padgett, Jr.

[57] ABSTRACT

The present invention relates generally to a portable meal preparation assembly which includes a microwave oven unit, a refrigeration or ice chest unit, a container unit for carrying articles necessary for meal preparation, and a power supply unit. Each of the units has the same rectangular dimensions so they are adapted to be stacked one upon the other vertically. A case is provided for removably containing or storing the vertically stacked units and transporting same. The case may be provided with a handle for manually carrying the stacked units or it may be provided with straps for carrying the stacked unit in a backpack manner. A frame is provided which includes generally vertically-oriented sides and an annular flange extending into the hollow interior of the frame and generally perpendicular to the sides. The flange is positioned between adjacent top and bottom surfaces of each the units and the vertically extending sides captures the lower and upper edge portions of adjacent units for preventing horizontal movement therebetween thereby maintaining the integrity of the stack. The entire vertically-stacked assemlby with its case can therefore be made portable and carried about so that whenever a person is ready for lunch or dinner, he simply takes the vertically stacked units from the case, disassembles them and puts each to its individual use for preparing his meal.

5 Claims, 1 Drawing Sheet

PORTABLE COMBINATION OF FOOD PREPARATION UNIT

BACKGROUND OF THE INVENTION

1. Field of the Invention

The present invention relates generally to portable meal preparation apparatus, and more particularly, to a combination microwave oven, refrigeration unit, storage compartment, and power supply together with a case therefore for carrying the various units in a vertical stack as a single integral package.

2. Description of the Prior Art

If a person desires to go on a picnic, to take his meal to work, or to have available the various types of apparatus or devices he might need for preparing a meal, he would normally be required to carry an ice chest with him together with a separate picnic basket or container or carrying various materials needed for food preparation. He would further be required to carry some type of portable charcoal or gas grill or burner in order to heat or cook any food he might desire cooked. The time required for lighting up the charcoal or cooking with gas and the like is relatively long and timeconsuming.

Furthermore, carrying separate units with him, and possibly other things such as a bag of charcoal, and the like, might require several trips between home and the automobile or between the automobile and the picnic or meal site.

The combination of the present invention provides all of the units necessary for preparing substantially any meal including a microwave oven unit as a heating or cooking media, a refrigerator or ice chest for keeping the food cool until preparation time, a storage container unit for carrying the various items needed for food preparation, and a power supply unit for powering at least the microwave oven, and preferably both the microwave oven and the refrigerator unit. The four units are each generally rectangular in shape and adapted to be vertically stacked one upon the other to make a single integral stack. The stacked units are then placed in a carrying case which can be carried via a handle or by straps, as in a conventional backpack configuration. This invention avoids all of the problems which had heretofore gone unsolved in the prior art while subscribing to none of the prior art's shortcomings.

BRIEF SUMMARY OF THE INVENTION

It is an object of the present invention to provide a combination including a microwave oven unit, a refrigeration unit, a power supply unit, and a food-container unit which can vertically stacked upon one another and easily carried in a case.

It is another object of the present invention to provide a carrying case for a vertical stack of units including a microwave oven, a refrigeration unit or ice chest, a power supply unit, and a food container unit which includes the use of a handle on the top of the case or straps which adapt the case to be carried in a conventional backpack manner.

It is a further object of the present invention to provide a combination of units wherein a means for keeping the food cool until it is to be prepared include either an electrically-powered refrigeration unit or an ice chest-type unit.

It is still another object of this invention to provide a meal preparation assembly including at least a microwave oven unit and a power supply unit for the microwave oven which can be stacked one upon the other and carried as a single unit.

It is yet another object of the present invention to provide a microwave oven unit and power supply unit adapted to be vertically stacked with at least one other unit including either a food container unit or a refrigeration unit.

It is still a further object of the present invention to provide a microwave oven unit provided with a means for connection to an auxiliary or external AC source of power for operating the microwave oven.

It is yet a further object of this invention to provide both a refrigeration unit and a microwave oven which may be connected to a source of external AC power for operating same.

It is another object of the present invention to provide a set of frame members which are adapted to be placed between the top and bottom surfaces of adjacent units for preventing horizontal motion between the adjacent surfaces thereof and maintaining the integrity of the vertical stack.

It is still another object of the present invention to provide an inwardly directed flange on a rectangular frame member with the flange directed towards the hollow interior for placement between the bottom and top edges of adjacent units to insure that the vertically-oriented sides of the frame abut the bottom and top edges of adjacent units to prevent any horizontal motion therebetween.

It is yet another object of the present invention to provide a pin and aperture configuration on adjacent top and bottom surfaces of the units to prevent horizontal motion therebetween once the pins are received in the pin apertures.

It is yet a further object of this invention to provide a portable assembly of units to facilitate food preparation at a remote location.

The present invention teaches a combination of a generally rectangular, compact, microwave oven unit, a generally rectangular refrigeration unit, a generally rectangular power supply unit for operating both the microwave unit and the refrigeration unit, and a generally rectangular container unit for carrying various food items which do not need refrigeration as well as other items or utensils required for cooking and eating a meal. Each of the generally rectangular units has a substantially equal length and width for enabling them to be vertically stacked one upon the other, and a carrying case is provided for removably enclosing the vertical stack in a single compact unit for manually carrying the case from place to place. Preferably, the case can include a handle means for manually carrying the combination unit about or various strap means adapted for enabling the carrying case to be hauled about in a backpack manner. An auxiliary source of AC power can be connected to operate the microwave oven and/or the refrigeration unit as desired. The refrigeration unit may be replaced with a conventional ice chest-type unit, if desired.

A generally rectangular frame means includes a plurality of rectangular frames each having a hollow interior. Vertically adjacent units are adapted to have the bottom of one unit and the top of the next vertically adjacent unit inserted within the hollow interiors of the frame. A flange member extends inwardly into the hollow interior and is generally perpendicular to the vertically-oriented sides of the frame. The bottom of one unit and the top of a vertically adjacent unit will be disposed against opposite sides of the flange to provide a spacer therebetween and to position the vertically-oriented sides of the frame against the upper and lower vertical edge portions of adjacent units to insure that the surfaces of the units cannot slide horizontally over one another, thereby maintaining the integrity of the vertical stack of units. A guide pin aperture and guide pin means can also be used to prevent horizontal motion of adjacent surfaces and insure the integrity of the stack.

DESCRIPTION OF THE PREFERRED EMBODIMENTS

Figure 1:
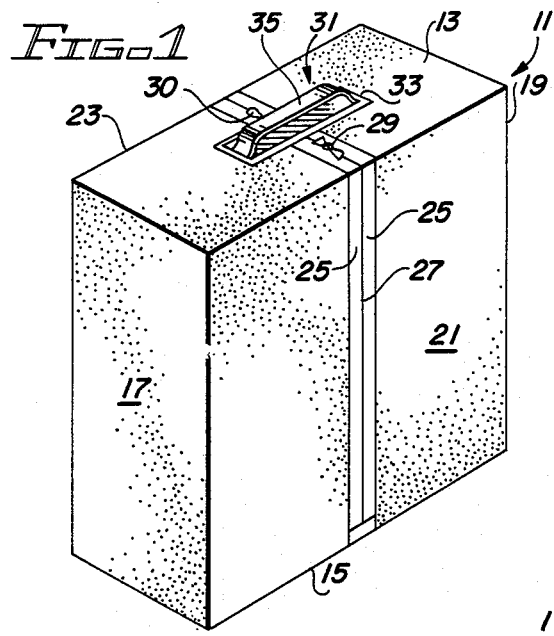
Figure 2:
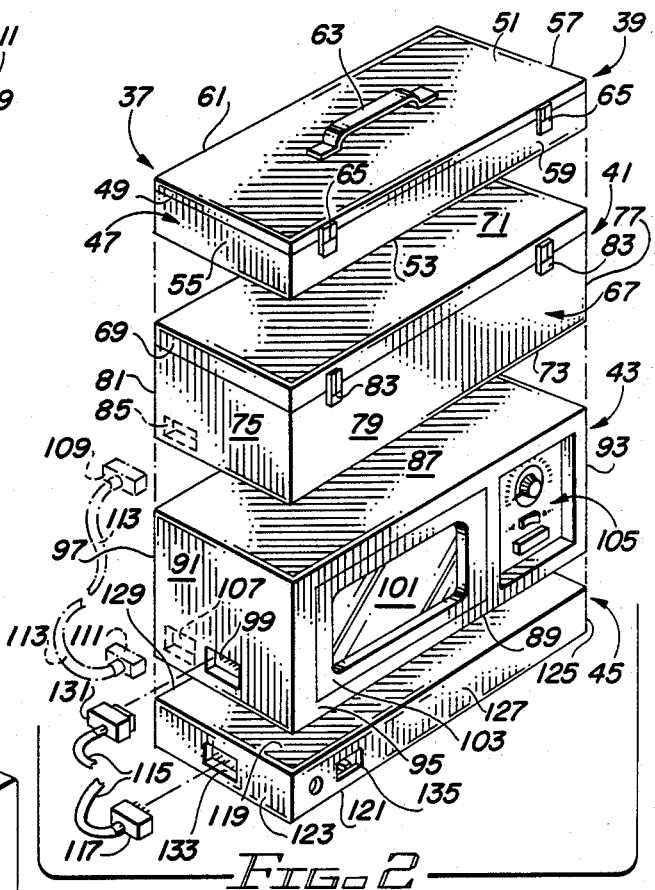

FIG. 1 shows the vertically stacked units of FIG. 2 removably stored within a carrying case 11. The carrying case 11 has an upper or top surface 13, a lower or bottom surface 15 which is substantially the same size as the top surface 13 and has a plane which is parallel to the plane of the top surface 13. The case 11 includes a left side panel 17 and a right side panel 19 which are equal in size and whose planes are parallel to one another and generally perpendicular to the planes of the top and bottom panels 13 and 15. Lastly, the case 11 has a front surface 21 and a rear surface 23 which are equal in size to one another. The plane of the front panel 21 is in parallel with the plane of the rear panel 23 and generally perpendicular to the planes of the top and bottom panels 13 and 15 and the left and right panels 17 and 19, respectively. A bias or border strip 25 extends across a portion of the bottom portion 15, the front surface 21, and a portion of the top surface 13 to secure a zipper 27 thereto having a zipper tab or zipper pull member 29 for opening and closing the case 11. A corresponding zipper tab 30 and zipper 27 is disposed across the other half of the top 13, down the rear surface 23 and across the other half of the bottom surface 15, as known in the art. The case 11 further includes a handel assembly 31 which includes a base support 33 operatively and fixedly secured to the top surface 13 of the case 11 and supporting a handle member 35 fixedly mounted thereon. The zipper 27 can be opened by the zipper tabs 29 and 30 on both sides of the case for inserting and removing the vertically stacked units of FIG. 2, as hereinafter described, and the unit of FIG. 1 is adapted to be manually carried by a hand inserted within the handle 31 from place to place or location to location, as desired.

FIG. 2 illustrates the vertical stack of units 37 of the present invention. The vertical stack 37 includes a container unit 39, a refrigeration unit/ice chest-type unit 41, a microwave oven unit 43, and a power supply unit 45. The container unit 39 has a box-like container bottom 47 and a top cover 49. The container unit includes a top surface 51, a bottom surface 53, a left side panel 55, a right side panel 57, a front surface or panel 59, and a rear surface or panel 61. A handle 63 is provided on the top surface 51 of the top cover 49 and is optional. Various types of fasteners or closure devices 65 are provided for opening and closing the top cover 49 on the box-like bottom 47, as known in the art. The refrigeration unit 41 includes a box-like bottom 67 and a top cover 69 therefore. The refrigeration unit 41 includes a top surface or top panel 71, a bottom surface or panel 73, a left side panel 75, a right side panel 77, a front side or panel 79, and a rear side or back panel 81. The refrigerator unit 41 is provided with fasteners or closure devices 83 for sealably opening and closing the top cover 69 onto the box-like bottom 67. The left side 75 is provided with a female socket aperture 85 for use as hereinafter described.

The microwave oven 43 is shown as having a top surface 87, a bottom surface 89, a left side 91, a right side 93, a front 95 and a back or rear 97. The left side 91 is provided with a first female power supply socket 99 and a second female power supply socket 107. The front 95 includes a door 103 provided with a glass observation port or window 101. The front 95 also includes a section 105 housing the controls and timer of the microwave oven 43, as conventionally known.

An AC power supply male connector 109 is adapted to be plugged into the female socket aperture 85 of the refrigeration unit 41. The male connector 109 is connected via the power cord 113 to the male connector 111 which is adapted to be received within the female socket 107 of the microwave oven 43. Similarly, the female socket 99 of the microwave oven 43 is adapted to receive the male connector member 131 which is connected via power supply cord 115 to the male connector member 117 which is then adapted to be inserted within the female socket 133 of the power supply unit 45. In this manner, electrical energy is normally supplied from the power supply unit 45 to the microwave oven 43 via the socket 133, male connector 117, power cord 115, male connector 131, and female socket 99 to complete the circuit. If refrigeration power is required, the additional connection may be made between the microwave oven 43 and the refrigeration unit 41 or, alternatively, between the power supply unit and the refrigeration unit, not shown, as per female socket 107, male terminal 111, power supply cord 113, male terminal 109, and female socket 85.

The power supply unit 45 includes a top surface or panel 119, a bottom surface or panel 121, a left side or panel 123, a right side or panel 125, a front panel 127 and a rear or back panel 129. As previously described, the left side 123 of the power supply 45 includes a female electrical socket 133. The front panel 127 includes a control section 135 as well. As conventionally known, the power supply 45 may include a set of storage batteries sufficient to produce, via a DC-to-AC converter, enough wattage for operating a relatively small microwave oven. The refrigeration unit 41 could also operate on converted AC power although it must be understood that it could also be provided with its own set of storage batteries and operated on DC or off of its own AC, via another DC-to-AC converter of its own. In order to save space however a single power supply unit is desirable as shown in FIG. 2.

Figure 3:
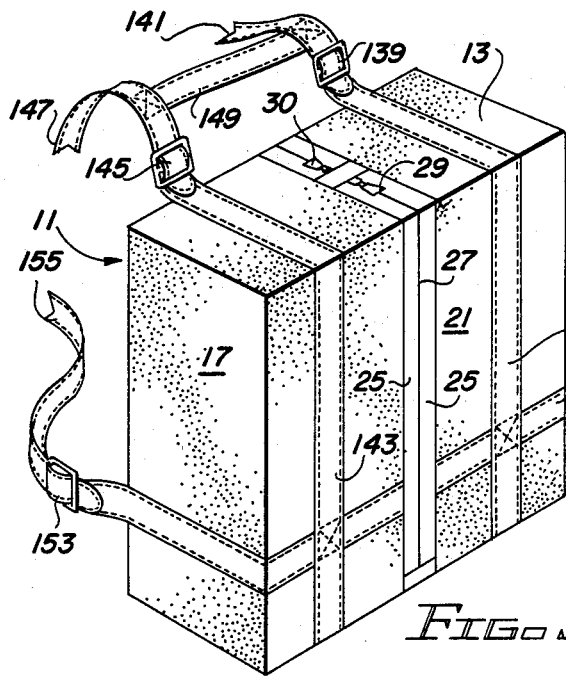

FIG. 3 illustrates the carrying case 11 of FIG. 1 where the handle means 31 has been replaced by straps. A first strap 137 extends to a buckle assembly 139 and then has a front end portion 141 adapted to extend down over the shoulders in front of the chest portion of the user. Similarly, a second strap 143 extends over the surface 21 of the carrying case 11 to the buckle assembly 145, and then a front end portion 147 extends over the shoulder and down the chest of the user, as conventionally known. A cross strap 149 is shown as connecting the right strap 141 to the left strap 147. A bottom strap 151 passes horizontally over the surface 21 of the case 11 and through a buckle assembly 153 to a stomach strap extension 155 adapted to go about the chest or stomach of the user. By using the straps 137, 143 and 151, the carrying case 11 which removably stores or houses the vertically stacked units of FIG. 2, can be carried in a conventional backpack manner, as known in the art.

Figure 4:
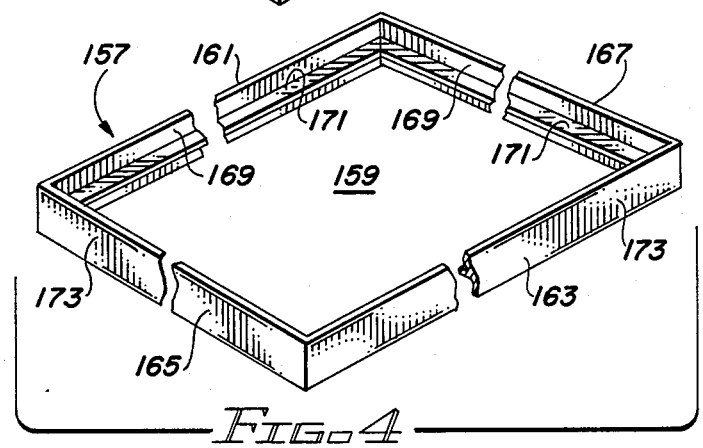

FIG. 4 illustrates an alternate embodiment of the present invention in the form of a frame member or frame assembly 157. The frame 157 includes a hollow interior 159 bounded by the frame which includes a first vertically-oriented longitudinal side 161, a second vertically-oriented longitudinal side 163 equal in length to the first longitudinal side 161 and having an axis parallel thereto. The frame 157 further includes a first vertically-oriental lateral side 165 and a second vertically-oriented lateral side 167 with the length of the second lateral side 167 being equal to the length of the first lateral side 165 and the axis of the first lateral side 165 being parallel to the axis of the second lateral side 167 and perpendicular to the axis of the first and second longitudinal sides 161, 163, so as to form a generally rectangular frame about the hollow interior 159. The inside surface 169 of each of the sides 161, 163, 165, and 167 of the frame 157 includes an inwardlydirected flange member 171 which is generally perpendicular to the plane of the inside surface 169 of the corresponding members or sides. Each of the frames has a continuous non-broken exterior or outer surface 173. The frame is adapted to be placed between the bottom of one unit and the top of the next vertically adjacent unit so that the bottom and top are received into the hollow interior 159 and the outer bottom and top vertical edges are disposed upon opposite sides of the flange 171 so as to produce a space or separation therebetween. Simultaneously, this locks or holds the vertically-oriented portions of each frame member on opposite sides of the flange 171 against the bottom and top side portions of adjacent units and completely prevents any type of horizontal motion between the vertically adjacent horizontal surfaces of the units. This then preserves the integrity of the vertically-oriented stack and prevents it from tumbling or coming apart except under sever conditions.

Figure 5:
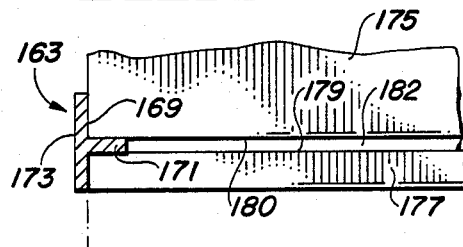
Figure 5:
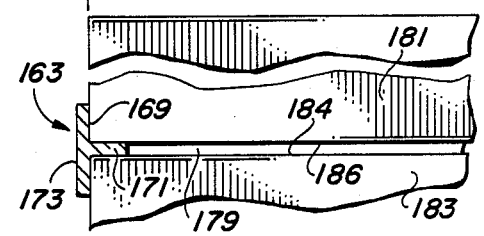

FIG. 5 better illustrates the employment of the frame of FIG. 4 between the bottom portion 175 of a first unit and the top portion 177 of an adjacent unit. The flange 171 is shown as being captured between the bottom surface 180 of the bottom portion 175 of one unit and the top surface 182 of the top portion 177 of an adjacent vertically stacked unit to form a space 179 therebetween. This captures the flange 171 therebetween and positions the inside surface 169 of a top portion of the vertically-oriented frame member so that it abuts the lower edges or vertical side portions of the bottom portion 175 and the upper edge portions of the top portion 177 of the vertically adjacent unit. The extension of the vertically-oriented upper and lower portions on either side of the flange 171 insures that the bottom surface 180 and the top surface 182 between adjacent units cannot slide horizontally but is virtually locked in the vertical stack to prevent tumbling or disassembly.

Similarly, another unit in the stack has a bottom portion 181 positioned adjacent a top portion 183 of an adjacent unit. Again, the top surface 184 of the top portion 183 of one unit is separated from the bottom surface 186 of the bottom portion 183 of an adjacent unit by the use of the spacer element or flange 171 which also locks the upper and lower edge portions to prevent horizontal motion therebetween, as previously described.

Figure 6:
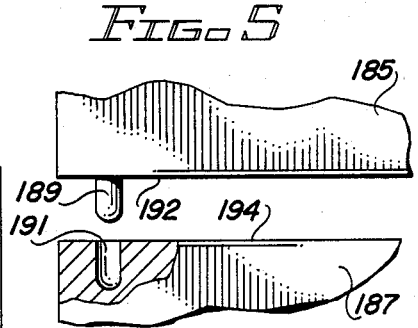

FIG. 6 illustrates an alternate embodiment to the frame of FIGS. 4 and 5. In FIGS. 6, the lower portion 185 of one unit is shown as including a bottom surface 192 while the top portion 187 of an adjacent unit is shown as having an upper surface 194. The bottom surface 192 of the bottom portion 185 is provided with a longitudinal pin member 189 extending generally perpendicular to the plane of the bottom surface 192 while a pin aperture 191 is located in the upper surface 194 of the top portion 187 of the adjacent unit. When the pin apparatus 189 is inserted within the pin aperture, the two surfaces 192 and 194 are locked against horizontal motion thereby preserving the integrity of the vertical stack.

It will be realized by those of ordinary skill in the art that various ones of the units may be omitted from the vertical stack or others added without changing the present invention. Similarly, the refrigeration unit and the ice chest-type unit can be substituted for one another or omitted, as desired. The size of the units including the size of the container unit can be increased or decreased as needed for a typical situation. Similarly, the power supply unit may be thicker depending on the number of storage cells or batteries required. It will also be understood that the vertically stacked units could be simply strapped together and carried rather than removably stored within the protected enclosing case, as shown in the preferred embodiment of the present invention. Furthermore, various types of power supplies may be used and the invention is no way limited to any particular type of power supply. Furthermore, the power supply could be omitted if the only locations to which the units would be carried would already be provided with a source of AC electricity.

It will be understood by those skilled in the art that various modifications, changes, variations, substitutions, and alterations can be made in the structure, composition, dimensions, materials, and combinations of the present invention without departing from the spirit and scope thereof which is limited only by the appended claims.

What is claimed is:

1. A portable food storage and preparation assembly comprising, in combination:

a generally rectangular, electrically-operated microwave oven means for at least one of warming, thawing and cooking food items to be eaten at least one of warmed, heated and cooked;

a generally rectangular, electrically-operated refrigerator means for maintaining food items at least one of fresh, frozen, cool and cold until ready for at least one of heating, cooking and consumption;

a generally rectangular, electrical power supply means for operating said microwave oven means and said refrigerator means;

a generally rectangular container means for carrying food items not requiring refrigeration, utensils, and eating necessities;

each of said microwave oven means, said refrigerator means, said power supply means and said container means having substantially identical lengths and widths for enabling them to be stacked vertically one upon the other to form a single, generally rectangular, vertical stack wherein corresponding sides of said vertically stacked microwave oven means, said refrigerator means, said power supply means and said container means are substantially coplanar with one another;

a carrying case means for substantially entirely enclosing said vertical stack therein;

a set of three generally rectangular frame members, said set of three frame members being adapted for separating and retainably positioning said microwave oven means, said refrigerator means, said power supply means and said container means in said single vertical stack;

each of said frame members including a pair of vertically-oriented longitudinal sides, an opposite pair of vertically-oriented lateral sides, said longitudinal sides being connected to said opposite pair of lateral sides at opposite ends thereof for forming a single integral frame member having a generally rectangular hollow interior window portion disposed centrally therein, each of said frame members including a centrally disposed, inwardly extending spacer flange generally perpendicular thereto and extending inwardly therefrom into said hollow interior window portion, said spacer flange being inserted between adjacently stacked ones of said microwave oven means, said refrigerator means, said power supply means and said container means for separating said microwave oven means, said refrigerator means, said power supply means and said container means, said frame members including vertically-oriented edge means on either side of said spacer flange, integral therewith, and generally perpendicular thereto for extending a predetermined distance vertical to and in an abutting relationship along the bottom side portions and top side portions of adjacent verticallystacked pairs of said microwave oven means, said refrigerator means, said power supply means and said container means for maintaining said vertical stack and preventing it from tumbling over.

2. The combination of claim 1 further including handle means operatively disposed on the top of said carrying case means for imparting portability thereto.

3. The combination of claim 1 further including strap means operatively disposed about said carrying case means for enabling same to be carried in a conventional backpack-type configuration.

4. The combination of claim 1 further including means for enabling a source of AC power to be supplied to said microwave oven means for operating same.

5. The combination of claim 1 further including means for enabling auxiliary AC power to be supplied to said refrigerator means for operating same.

* * * * *